June 22, 1948. A. P. FALL 2,443,853
ALIGHTING GEAR SCRAPER
Filed Nov. 1, 1944 2 Sheets-Sheet 1
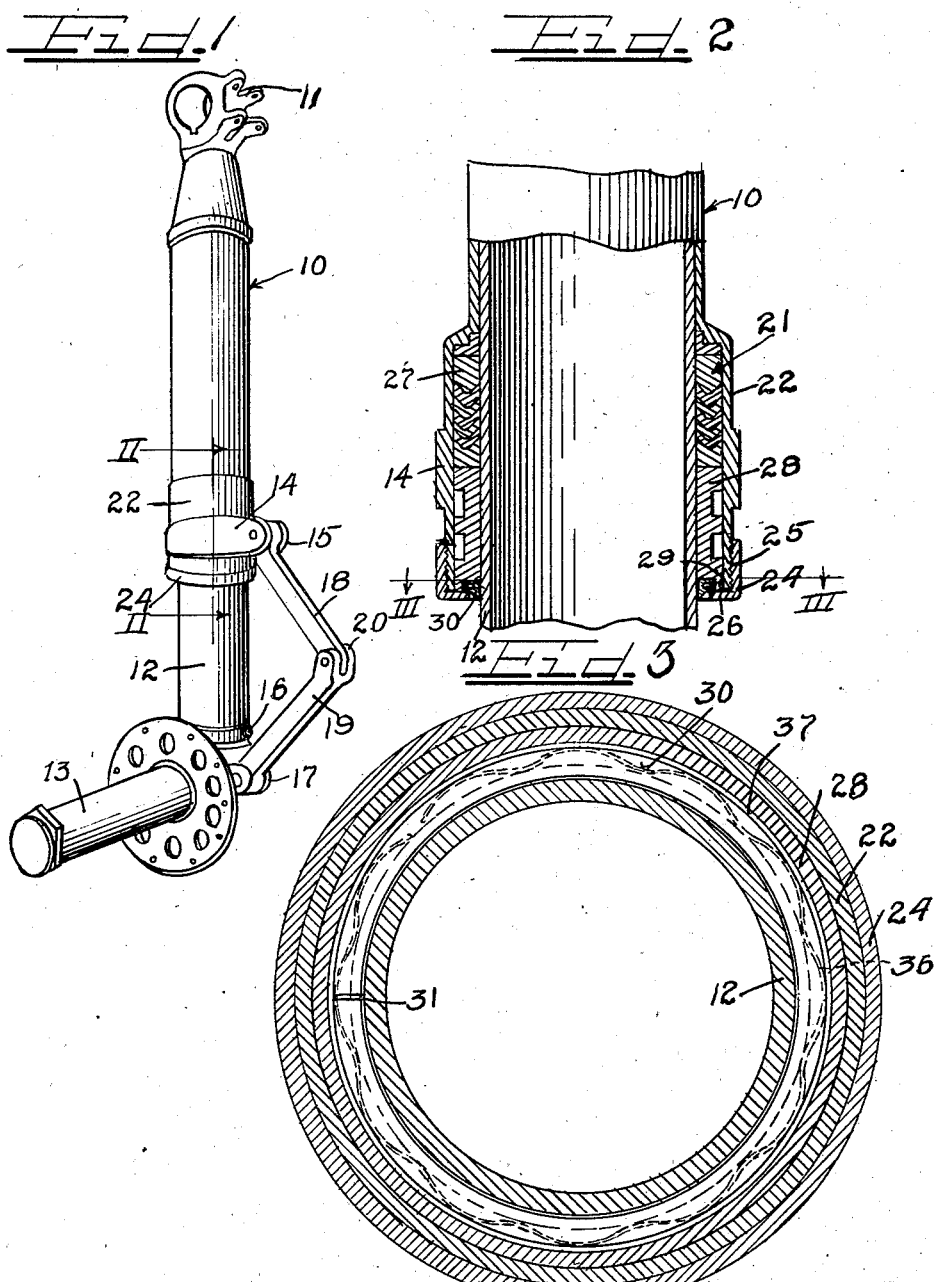

June 22, 1948.  A. P. FALL  2,443,853
ALIGHTING GEAR SCRAPER
Filed Nov. 1, 1944  2 Sheets-Sheet 2
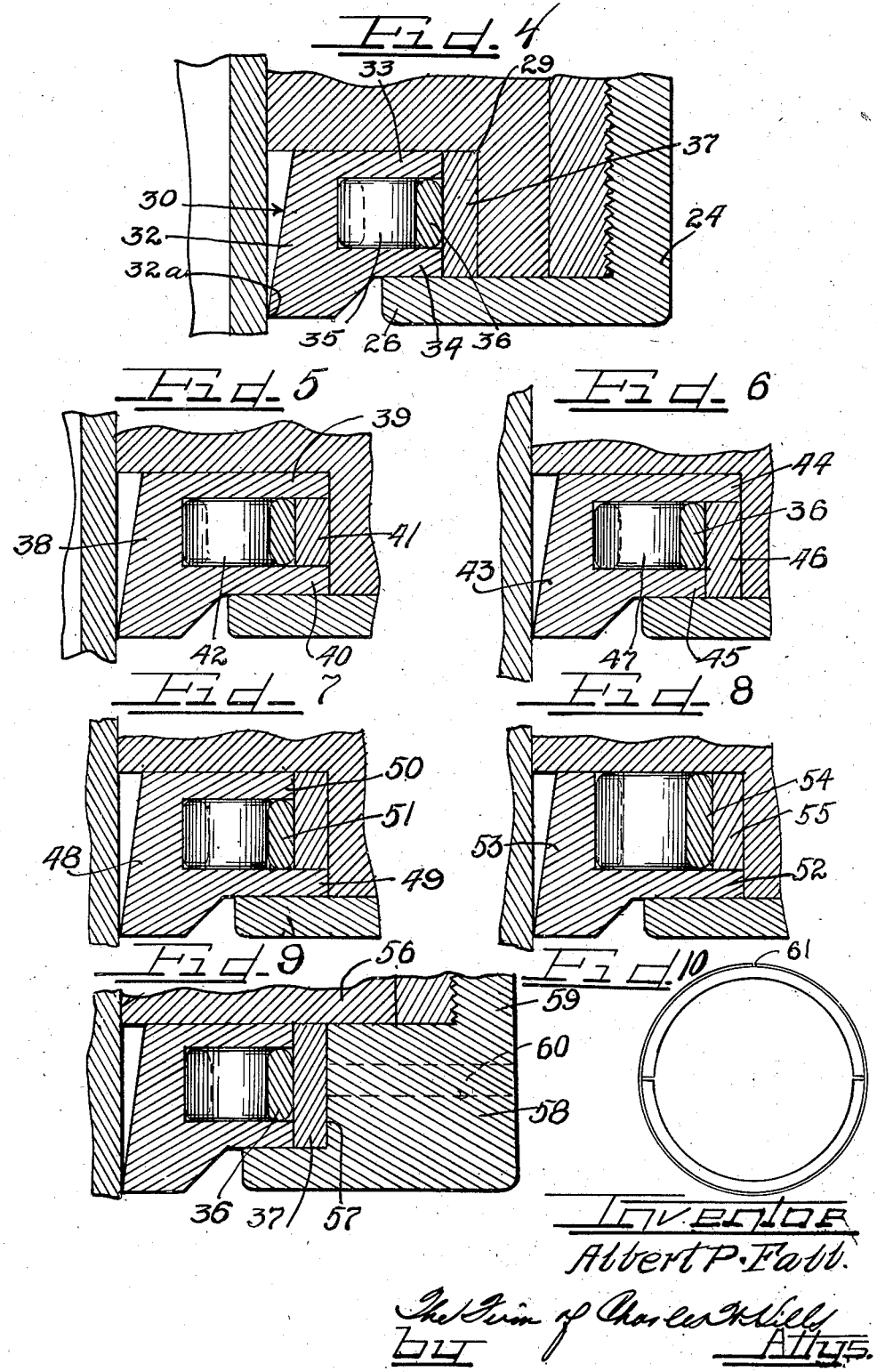
Inventor
Albert P. Fall Patented June 22, 1948

2,443,853

UNITED STATES PATENT OFFICE 2,443,853

ALIGHTING GEAR SCRAPER

Albert P. Fall, Toledo, Ohio

Application November 1, 1944, Serial No. 561,362

4 Claims. (Cl. 286—18)

My invention relates to a scraper ring assembly, particularly, although not exclusively, for use with an alighting gear for aircraft or the like.

My invention has for its principal object the improvements of a scraper ring assembly for retractable alighting gear whereby such a gear is enabled to withstand extreme conditions for a greater number of flying hours than is the case with prior structures.

An alighting gear of the type shown herein by way of example includes an upper sleeve, the upper end of which may be pivotally attached to the aircraft and the lower rod, on the bottom of which the axle of the wheel is attached. The lower rod telescopes slidingly within the upper sleeve with shock absorbing action. The shock absorbing medium within the sleeve of the strut structure is usually oil or some other satisfactory fluid and thus it is necessary that an efficient seal be established between the lower, inside surface of the sleeve and the outside surface of the rod.

With packing gland structures utilized in the past, it has been determined that considerable difficulty has been experienced when the alighting gear is subjected to extreme conditions brought about by the great distances in the present-day aircraft travel. The difficulty with such prior structures is that as the rod slides within the sleeve, dirt, grit, frost, ice or moisture which sticks to the outer surface of the rod will be ground into the packing gland thereby injuring it and allowing the shock absorbing medium to leak.

It is therefore an important object of the present invention to provide an improved scraper ring assembly for use with a packing gland assembly which affords an efficient seal for the operating liquid; and the scraper ring assembly efficiently removes contaminating moisture, dirt or ice from the rod after each has accumulated thereon, this cleaning operation taking place during the reciprocation of the rod into the sleeve and being effective upon very thin layers of extraneous, contaminating matter.

One of the contributing factors to the difficulties which are encountered in alighting gear having packing glands of prior arrangements, is that under present conditions a plane may in a single flight traverse areas having extreme weather conditions. For instance, a single flight may encounter extremely low temperatures whereupon frost and ice accumulate on the rod and also may traverse desert areas over which the air carries a considerable percentage of sand and grit.

It is another object of the present invention to provide an improved scraper ring assembly in which the accumulated ice is efficiently removed from the rod so that it will not be forced past the packing gland to serrate the same and initiate oil leakage.

In my patent application, Serial No. 562,113 filed November 6, 1944, now Patent No. 2,431,796, which is a continuation-in-part of my application Serial No. 539,970, filed June 12, 1944, I describe and claim a packing gland assembly including a split wiper annulus having an inner cutting edge and an outer compressor carrier groove housing with a resilient compressor for urging the cutting edge inwardly against the surface of the telescoping rod to be wiped, the cutting edge being positively urged into engagement with the extraneous matter on the rod so that it will not ride over the same when the rod slides thereby.

It is an object of my present invention to provide an improvement in the wiper arrangement for packing glands to be used on alighting gears of the type described and claimed in my above mentioned co-pending application.

A still further object of the present invention is to provide a unitary scraper ring assembly including a one-piece split annulus, a one-piece split compressor about the annulus and an endless cover about the compressor to retain the ring, compressor and cover in operative relationship as a unitary assembly.

Further objects and advantages of my invention will become apparent from the following description referring to the accompanying drawings, and the features of novelty which characterize my invention will be pointed out with particularity in the claims annexed to and forming a part of this specification.

On the drawings:

Figure 1 is a perspective view of a landing strut assembly which is provided with my invention;

Figure 2 is a sectional side elevation taken along the lines II—II of Figure 1;

Figure 3 is an enlarged cross-sectional view taken along the lines III—III of Figure 2;

Figure 4 is a fragmentary enlarged cross-sectional view of the wiper and scraper construction formed according to my invention;

Figures 5, 6, 7 and 8 are fragmentary enlarged cross-sectional views of wiper constructions which are provided with modifications of my invention;

Figure 9 is a fragmentary enlarged cross-sectional view of the wiper construction of Figure 4 being supported in the outer cylinder of the landing gear in a modified manner; and Figure 10 is a plan view of a complete unitary scraper ring assembly of the present invention.

Referring to Figure 1 of the drawings, the alighting gear shown includes an upper sleeve 10 which serves as a compression cylinder into which there is telescoped a rod 12. The opposite end of the cylinder 10 is provided with a head 11 by means of which the entire alighting assembly may be pivotally secured to the associated aircraft for retraction. As will be seen from Figure 2 the lower end of the sleeve is open so as to slidingly receive the rod 12 and the lower end of the rod 12 is provided with a suitable axle assembly 13 for receiving the aircraft wheels.

In order to mount the rod 12 for reciprocatory or axial movement and still prevent rotational movement thereof, a collar 14 having lugs 15 is provided in nonrotatable relationship around the lower end of the sleeve 10. Another similar collar 16 having lugs 17 is provided at the lower end of the rod 12, these collars being connected by a torque link assembly including links 18 and 19 which are pivoted together at 20 and are pivoted at their remote ends respectively to the lugs 15 and 17. Thus it will be seen upon application of pressure to the alighting assembly the rod 12 will be enabled to reciprocate through the lower end of the sleeve 10, the torque linkage moving to accommodate this reciprocation and at the same time positively preventing rotation of the rod within the sleeve 10.

In order to provide a construction which will prevent the leakage of a suitable shock absorbing fluid such as oil from the space within the cylinder 10, there is provided a packing gland assembly 21 which is a cylindrical arrangement and is housed within an enlarged portion 22 at the lower end of the sleeve 10.

The packing gland assembly is disposed within the enlarged portion 22 of the sleeve and is compressed therein by a nut 24 having an upwardly extending flange that is internally threaded to engage with external threads at the lower end of the portion 22 of the sleeve as is shown at 25. The nut 24 is provided at its lower part thereof with a radially inwardly extending flange 26, the inner end of which prescribes a circle having a diameter somewhat larger than the outside diameter of the rod which passes therethrough. Thus, there is provided between the edge of the flange 26 and the rod 12 an annular space available for the purposes which shall be presently described.

In order that the packing gland assembly 21 may carry out its principal purpose, that is, the provision of a tight sliding seal between the sleeve 10 and the rod 12, a compressible sealing portion 27 made up of a plurality of segments in the usual manner is provided in the upper part of the enlarged housing portion 22. The packing gland assembly is completed by the provision of an annular bearing member 28 which fits within the lower part of the enlarged housing 22 of the sleeve 10 and has an inside diameter of such size that it slidingly receives the rod 12. This packing assembly is maintained in the sleeve as shown in Figure 2 by the attachment of the nut 24 upon the lower end of the sleeve whereupon the flange 26 thereof is drawn upwardly against the bearing member 28 to compress the yieldable gland portion 27 into the position shown.

As has already been brought out, one of the major difficulties encountered in constructions in which telescopically movable members are provided, is the entrance of sharp particles such as ice, grit and dirt into the sliding junction between the telescoping parts, whereby the sealing gland is cut and serrated and the outer surface of the rod is worn or grooved so that oil may leak out from between the members. This condition then progresses more rapidly since the leaking oil picks up particles of grit whereby during further reciprocation of the rod, destruction of the seal develops at an increasingly rapid rate. It has been determined that even a slight coating of frost upon the outer surface of the rod 12 contributes to this undesirable condition, and it is therefore necessary and desirable to provide some means which will efficiently remove any contaminating matter whatsoever from the outer surface of the rod and leave this surface substantially clean as it passes through the sealing gland.

In order to provide a construction in which a wiping or scraping arrangement is incorporated, an annular groove 29 is provided at the outer edge of the bearing member 28. It will be noted that since the groove 29 is positioned in the extreme lower part of the sleeve 10, the wiper assembly therein, to be presently described, will engage the surface of the rod 12 during the retraction thereof, before that portion of the surface so engaged passes along the impurities which will cause injury to the sealing gland portion 27. Thus the rod surface is clean before it passes the gland and in this manner the introduction of cutting particles and moisture to the gland junction by the retraction of the rod is substantially eliminated.

The wiper or scraper assembly shown in the drawings includes a wiper-scraper annulus 30, as will be seen more particularly in the enlarged view of Figure 4, which is split as shown at 31 in Figure 3. The wiper annulus 30 includes a radially inner portion 32 which is provided with a downwardly projecting rod engaging, cutting edge 32a and a radially outer portion 33 which seats within the bearing groove 29. The outer portion 33 it will be seen is in the form of a radially extending flange and the opposite edge of the annulus is provided with another flange 34 which is adapted to engage the adjacent surface of the inwardly extending flange 26 of the nut 24. Between these flanges therefore is provided a groove 35 into which is placed a compression arrangement which may be of any suitable type such as an undulated spring steel annulus 36 having a depth substantially equal to the compressor groove 35 in the wiper annulus 30, as will be seen more particularly in Figure 3. Such an arrangement for removing impurities from the outer surface of the rod is described and claimed in my above mentioned co-pending application.

In order to provide a unitary construction in which the compressor spring is maintained in its desired position during operation of the alighting gear on an aircraft, an endless compressor retainer or cover 37 is provided, as is shown in Figure 4, with the inner surface thereof adjacent the outer edges of the flanges 33 and 34. The spring is therefore provided in the groove 35 with the radially inwardly extending peaks bearing against the inner surface or bottom of the groove 35 and the radially outwardly extending peaks bearing against the inner surface of the compressor cover 37. It will therefore be seen that the compressor spring 36 urges the entire wiper annulus radially inward so that the edge 32a bears inwardly against the outer surface of the rod 12 as the latter is retracted into the sleeve, and since the resilient spring is maintained within the compressor groove of the annulus and inside the cover, a relatively constant force will be provided and the resilient spring is prevented from falling out of place or varying in pressure. Furthermore, this construction as is shown in Figure 4 has an independent floating action, and allows for possible strut side thrust. Furthermore, with the solid ring for a cover, or if the cover is split in one place, the spring may be suitably positioned before the wiper is assembled in the housing 22 and thus the assembly thereof is facilitated. Also, with this construction, even though there is a relatively large side thrust on the inner cylinder while the airplane is landing which might cause a heavier pressure on one side of the compressor than the other, but with the fulcrum of the outside of the compressor on the inner surface of the cover member, pressure is always maintained the same on all sides, as the compressor cover provides an independent fulcrum.

In the drawings in Figures 5 through 8, I have illustrated modifications of the compressor annulus and cover design of Figure 4. Thus, in Figure 5, an annulus 38 is provided with flanges 39 and 40 which are sufficiently long to abut against the adjacent inner surface of the housing 28. A cover member 41 is therein provided within a groove 42 between the flanges 39 and 40 with the edges of the cover 41 abutting against the radially extending surfaces of the flanges 39 and 40 adjacent their outer ends. With this construction, it will be seen that a narrower cover member 41 is provided than with the construction illustrated in Figure 4.

In the construction illustrated in Figure 6, an annulus 43 is provided with an inner radially extending flange 44 similar to the flange 39 but with the outer radially extending flange 45 shorter by an amount equal to the thickness of a cover member 46. With this construction, the cover member 46 will lie contiguous with the outer axially extending edge of the flange 45 and contiguous with the radially extending surface of the flange 44. A similar spring member 36 may, of course, be provided within the groove 47.

The construction illustrated in Figure 7 is similar to that of Figure 6 except that the wiper annulus 48 has a longer flange 49 at the outer end and a shorter flange 50 at the inner end so that the cover 51 is displaced slightly from the position of the cover 46 in Figure 6.

In the construction illustrated in Figure 8, only one flange 52 is provided on the ring 53 and thus a wider spring 54 may be provided inside the cover member 55. Thus, by removing the inner flange a wider spring may be employed in the construction of Figure 8.

In the construction of Figure 9, a wiper assembly is shown similar to that illustrated in Figure 4, but instead of placing the wiper assembly in a groove in the outer edge of the bearing 56 which is otherwise similar to the bearing 28, a groove 57 is provided in the radially inwardly extending flange 58 of the nut 59. The nut 59 it will be seen is provided with a plurality of slots 60 only one being shown in the drawings, such slots being of the conventional type in the nuts so as to accommodate a spannier wrench through which the nut may be either tightened or loosened. My improved wiper arrangement which includes the outer cover for the compressor is particularly advantageous in this type of a construction as the cover 37 is placed between the spring 35 and the surface of the groove 57 so as to prevent the possibility of one of the outwardly extending portions of the undulating spring from becoming caught within the openings 60 of the nut 59.

In order to take care of any irregularities in the outer surface of the cover and the contiguous surface of the groove in which the cover seats, the cover may be slit as shown at 61 in Figure 10. Also if the ring is sufficiently resilient or if it is split it may be flexed sufficiently to be installed without removing the landing axle etc. Under such conditions the wiper body may be split in two places so as to facilitate its assembly such a two piece wiper being described and claimed in my above mentioned application.

Although I have shown and described particular embodiments of my invention, I do not desire to be limited to the particular embodiments described, and I intend the appended claims to cover all modifications which do not depart from the spirit and scope of my invention.

I claim as my invention:

1. A scraper ring assembly comprising a one piece split ring having a cutting edge for engaging the surface of an encompassed rod, said ring having radially extending flanges forming a circumferential groove about its convex surface, a one piece split resilient compressor of sinuous contour in said groove, and an endless cover member surrounding the compressor to retain it in the groove in said ring and to cause it to act against the ring with squeeze grip action, said endless cover member being arranged with at least one of its edges in contact with the inner radial surface of a ring flange.

2. A unitary scraper ring assembly comprising a one-piece split annulus having an inwardly inclined cutting edge and outwardly extending axially spaced flanges forming a circumferential groove, a one-piece split contractible compressor spring within said groove, and an annular cover member positioned within said groove and confining said compressor spring under radial pressure against the bottom of said groove to constantly urge a constriction of said split annulus.

3. In an alighting gear for aircraft and the like, including inner and outer telescoping members defining an annular space open at one end, a unitary scraper ring assembly positioned in said space comprising a one-piece split annulus having an inwardly inclined cutting edge for scraping said inner member and having outwardly extending flanges forming a circumferential groove, a one-piece split contractible compressor spring within said groove, an annular cover member positioned in said groove and backed by said outer member to confine said compressor spring under radial pressure against the bottom of said groove to constantly urge a constriction of said split annulus and an annular member secured to said outer member and having an inturned portion abutting said annulus to retain said scraper ring assembly in said annular space.

4. A scraper ring assembly comprising a one-piece split ring having an inner edge for engaging the surface of an encompassed rod, said ring having radially extending flanges forming a circumferential groove about its convex surface, a contractible compressor of sinuous contour in said groove, and an endless cover member within said groove and surrounding the compressor to retain the same in the groove in said ring and to cause said compressor to act against said ring with a squeeze grip action.

ALBERT P. FALL.

REFERENCES CITED

The following references are of record in the file of this patent:

UNITED STATES PATENTS

| Number | Name | Date |
|---|---|---|
| 367,207 | Hughes | July 26, 1887 |
| 1,327,801 | Blacke | Jan. 13, 1920 |
| 1,828,030 | Davis | Oct. 20, 1931 |
| 1,992,746 | Fortune | Feb. 26, 1935 |
| 2,290,507 | Thompson | July 21, 1942 |
| 2,368,137 | Harmon | Jan. 30, 1945 |

FOREIGN PATENTS

| Number | Country | Date |
|---|---|---|
| 344,928 | Germany | 1921 |